United States Patent
Yamaji (10) Patent No.: US 8,861,889 B2
(45) Date of Patent: Oct. 14, 2014

(54) IMAGE PROCESSING DEVICE, METHOD AND PROGRAM FOR EXTRACTING STILL IMAGE DATA FROM MOVING IMAGE DATA

(75) Inventor: Kei Yamaji, Tokyo (JP)

(73) Assignee: Fujifilm Corporation, Tokyo (JP)

( * ) Notice: Subject to any disclaimer, the term of this patent is extended or adjusted under 35 U.S.C. 154(b) by 318 days.

(21) Appl. No.: 13/072,807

(22) Filed: Mar. 28, 2011

(65) Prior Publication Data

US 2011/0242336 A1 Oct. 6, 2011

(30) Foreign Application Priority Data

Mar. 31, 2010 (JP) ................................. 2010-083427

(51) Int. Cl.
*G06K 9/36* (2006.01)
*G06T 11/60* (2006.01)
*G06K 9/00* (2006.01)
*H04N 1/387* (2006.01)

(52) U.S. Cl.
CPC ................ *H04N 1/387* (2013.01); *G06T 11/60* (2013.01); *G06K 9/00711* (2013.01)
USPC .......................................... 382/284; 382/294

(58) Field of Classification Search
CPC ............. G06T 3/4038; G06K 9/00711; H04N 1/00196
USPC .................................................. 382/284, 294
See application file for complete search history.

(56) References Cited

U.S. PATENT DOCUMENTS

| | | | | |
|---|---|---|---|---|
| 5,135,401 A | * | 8/1992 | Feldman-Schorrig | 434/395 |
| 6,111,586 A | * | 8/2000 | Ikeda et al. | 345/619 |
| 6,202,061 B1 | * | 3/2001 | Khosla et al. | 1/1 |
| 7,054,508 B2 | * | 5/2006 | Hanamoto | 382/305 |
| 7,327,905 B2 | * | 2/2008 | Tsue et al. | 382/305 |
| 7,656,543 B2 | * | 2/2010 | Atkins | 358/1.13 |
| 7,995,865 B2 | * | 8/2011 | Hara et al. | 382/294 |
| 8,264,502 B2 | * | 9/2012 | Wang et al. | 345/619 |
| 8,379,054 B2 | * | 2/2013 | Katayama et al. | 345/629 |
| 2001/0048802 A1 | * | 12/2001 | Nakajima et al. | 386/46 |
| 2002/0031262 A1 | * | 3/2002 | Imagawa et al. | 382/190 |

(Continued)

FOREIGN PATENT DOCUMENTS

| | | |
|---|---|---|
| JP | 2006-277729 | 10/2006 |
| JP | 2006-279939 | 10/2006 |
| JP | 2007-194829 | 8/2007 |
| JP | 2008-065792 | 3/2008 |

OTHER PUBLICATIONS

JP Office Action dated Mar. 19, 2013, with partial English translation; Application No. 2010-083427.

*Primary Examiner* — Gandhi Thirugnanam
(74) *Attorney, Agent, or Firm* — Young & Thompson (57) ABSTRACT

An image processing device for determining extraction conditions for extracting still images from a moving image according to a template and arranging the still images. The image processing device includes an image data input unit, an operating unit, a display, a material selector for selecting a template applied to layout data and moving image data, an extraction condition determiner for determining extraction conditions for extracting still image data from the moving image data according to a selected template, a moving image analyzer for analyzing the moving image data, a still image data extractor for extracting the still image data meeting extraction conditions from the moving image data according to analysis results, and a layout synthesizer for producing the layout data by positioning the extracted still image data in corresponding synthesis areas of the template.

13 Claims, 8 Drawing Sheets

(56) References Cited

U.S. PATENT DOCUMENTS

| | | | |
|---|---|---|---|
| 2002/0122067 A1* | 9/2002 | Geigel et al. | 345/788 |
| 2002/0154147 A1* | 10/2002 | Battles | 345/660 |
| 2003/0072486 A1* | 4/2003 | Loui et al. | 382/175 |
| 2003/0189738 A1* | 10/2003 | Kuwata et al. | 358/527 |
| 2005/0128518 A1* | 6/2005 | Tsue et al. | 358/1.15 |
| 2005/0134933 A1* | 6/2005 | Tsue et al. | 358/437 |
| 2005/0134947 A1* | 6/2005 | Tsue et al. | 358/537 |
| 2006/0103891 A1* | 5/2006 | Atkins | 358/450 |
| 2006/0198559 A1* | 9/2006 | Manico et al. | 382/305 |
| 2006/0204044 A1* | 9/2006 | Takemoto et al. | 382/107 |
| 2006/0204129 A1* | 9/2006 | Sawano | 382/276 |
| 2006/0210165 A1* | 9/2006 | Takemoto et al. | 382/190 |
| 2006/0210166 A1* | 9/2006 | Takemoto et al. | 382/190 |
| 2007/0064278 A1* | 3/2007 | Sugimoto | 358/453 |
| 2008/0089592 A1* | 4/2008 | Isomura | 382/224 |
| 2008/0089612 A1* | 4/2008 | Isomura | 382/295 |
| 2008/0260289 A1* | 10/2008 | Hara et al. | 382/294 |
| 2009/0003731 A1* | 1/2009 | Nitta et al. | 382/298 |
| 2009/0119583 A1* | 5/2009 | Kihara et al. | 715/273 |
| 2009/0148071 A1* | 6/2009 | Ohwa et al. | 382/306 |
| 2009/0244625 A1* | 10/2009 | Hasegawa et al. | 358/1.17 |
| 2009/0244646 A1* | 10/2009 | Kondo et al. | 358/448 |
| 2009/0245643 A1* | 10/2009 | Hasegawa et al. | 382/181 |
| 2010/0008570 A1* | 1/2010 | Urashima | 382/165 |
| 2011/0242336 A1* | 10/2011 | Yamaji | 348/207.2 |
| 2012/0020648 A1* | 1/2012 | Yamaji | 386/278 |
| 2013/0058579 A1* | 3/2013 | Kawanishi et al. | 382/195 |

* cited by examiner

IMAGE PROCESSING DEVICE, METHOD AND PROGRAM FOR EXTRACTING STILL IMAGE DATA FROM MOVING IMAGE DATA

BACKGROUND OF THE INVENTION

The present invention relates to an image processing device, an image processing method, and a program for extracting still image data from moving image data to obtain layout data and more particularly to an image processing device, an image processing method, and a program for determining extraction conditions for extracting still image data from moving image data according to a selected template and extracting still image data meeting the extraction conditions based on moving image data analysis results to produce layout data.

As digital still cameras of recent years acquire enhanced performance, some of those placed on the market are now capable of recording high-resolution moving images. Accordingly, there are demands for cutting out still images including panoramic images from a moving image and print them or producing a photograph album. To meet such demands, there are various propositions for extracting appropriate still images from a moving image and arranging them in a desired layout.

JP 2006-277729 A, for example, describes an image output device capable of outputting composite images of a moving image by automatic arrangement or trimming according to the direction in which an object contained in the moving image composite images extracted from the moving image moves in such a composition that an observer does not feel uneasy looking at the layout.

JP 2007-194829 A describes a camera whereby when, during replay and display of a moving image, a moving image from which a central still image to be placed at the center of a layout showing still images obtained from moving images is to be extracted is selected, images acquired before and after the central image (pickup images) are reduced in size, and arranged in their predetermined positions, thus obtaining still images in which the user had particular interest or with which the user empathized from successively acquired images such as a moving image.

SUMMARY OF THE INVENTION

However, a device as described in JP 2006-277729 A that analyzes a moving image and extracts still images based on composites of the moving image A or a camera as described in JP 2007-194829 A obtaining a plurality of still images by picking up images acquired before and after a still image selected by the user fails to obtain still images that can be appropriately placed in a desired layout to produce prints or a photograph as desired by the user.

Further, conventional devices such as those described in JP 2006-277729 A and JP 2007-194829 A do not consider producing prints or a photograph album using a template from a plurality of moving images and still images. In addition, where a moving image is excessively long, the moving image may allow too many still images to be extracted therefrom, possibly increasing the work on the part of the user to select still images therefrom for use in prints or a photograph album.

Other problems encountered by the prior art include one posed by the difference in aspect ratio when still images are extracted from a moving image because the user could not judge whether a still image to be extracted has an aspect ratio that is the same as that of the original moving image or a still image to be extracted has a panoramic size, which has a different aspect size than the moving image.

An object of the present invention is to provide an image processing device, an image processing method, and a program that determine extraction conditions for extracting still images from a moving image according to a template and arranges the extracted still images according to the template to produce synthesized layout data where appropriate still images are combined.

In order to attain the object described above, the present invention provides an image processing device for obtaining layout data by extracting still image data from moving image data, comprising:

an image data input unit for receiving image data containing at least the moving image data, an operating unit used by a user for operating an image processing application, a display for displaying the image processing application, a material selector for selecting a template and the moving image data applied to the layout data, an extraction condition determiner for determining extraction conditions for extracting the still image data from the moving image data according to a selected template, a moving image analyzer for analyzing the moving image data, a still image data extractor for extracting the still image data meeting the extraction conditions from the moving image data according to an analysis results, a layout synthesizer for producing the layout data by positioning extracted still image data in corresponding synthesis areas of the template, and a recorder for recording the moving image data, the still image data, and the layout data.

Also, the present invention provides a print production system comprising the image processing device described above and a printer for printing the layout data.

Also, the present invention provides a photograph album production system comprising the image processing device described above, a printer for printing the layout data and a book binding device for binding printed paper sheets.

Also, the present invention provides an image processing method for obtaining layout data by extracting still image data from moving image data, comprising the steps of:

receiving image data containing at least the moving image data, selecting a template and the moving image data applied to the layout data, determining extraction conditions for extracting the still image data from the moving image data according to a selected template, analyzing the moving image data, extracting the still image data meeting the extraction conditions from the moving image data according to an analysis results, and producing the layout data by positioning extracted still image data in corresponding synthesis areas of the template.

Also, the present invention provides a computer program product, comprising a computer readable recording medium having a computer program code recorded thereon, for causing a computer to execute the steps of the image processing method described above.

According to the present invention, the extraction conditions for extracting still images from a moving image are determined according to a selected template, which saves the user the time and effort for selecting still images from numerous candidate still images and whereby still images having different aspect ratios can be readily extracted to produce layout data and produce prints or a photograph album based on the template.

DETAILED DESCRIPTION OF THE INVENTION

The following describes in detail the image processing device of the present invention for implementing the image processing method of the invention based upon the preferred embodiments illustrated in the accompanying drawings.

Figure 1:
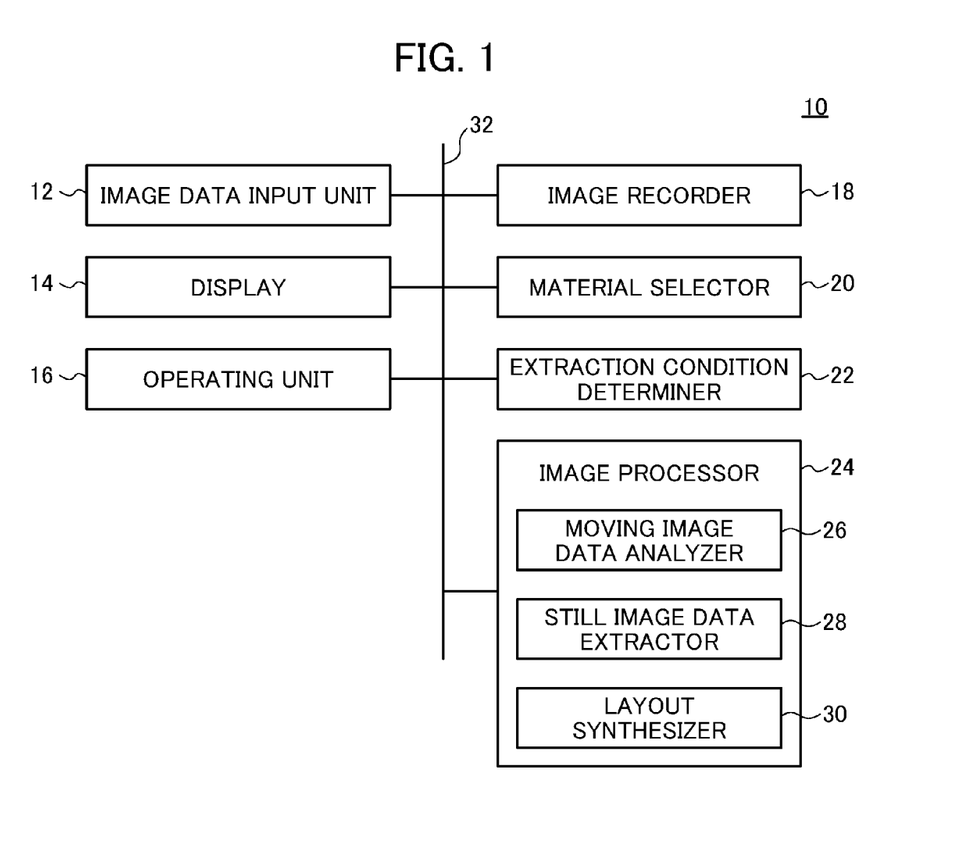
FIG. 1 is a block diagram showing an example of a configuration of the image processing device for implementing the image processing method of the present invention.

FIG. 1 is a block diagram of an embodiment showing a configuration of the image processing device of the present invention.

An image processing device 10 illustrated in FIG. 1 comprises an image data input unit 12, a display 14, an operating unit 16, an image recorder 18, a material selector 20, an extraction condition determiner 22, and an image processor 24, all these being connected by a bus 32. The image processor 24 comprises a moving image data analyzer 26, a still image data extractor 28, and a layout synthesizer 30. This embodiment will be described taking an example of production of a photograph album.

The image data input unit 12 has an external interface and receives moving image data and still image data to be used for producing a photograph album. The image data supplied to the image data input unit 12 is not specifically limited and may be various image data including moving image data and still image data acquired by the user with a digital still camera or a digital video camera and moving/still image data downloaded from a network. The external interfaces include USB (Universal Serial Bus), memory card reader/writer, optical discs, and wired and wireless LAN (Local Area Network). Image data supplied to the image data input unit 12 is outputted as material image data. The following describes a case where moving image data is used as material image data.

The display 14 shows an editing screen of an image processing application, an operation screen used when placing an order for a photograph album, and the like. The user operates an image processing application on the screen using the operating unit 16 while viewing the display 14.

The operating unit 16 is provided for the user to operate the image processing application that is run in the image processing device 10. The operating unit 16 is not particularly limited, and any of various known operating devices may be used such as a keyboard, a mouse, and a touch panel.

The image recorder 18 records such data as entered material image data (moving image/still image data), extracted still image data, and layout data having still images arranged on a template using an image processing application. The image recorder 18 may be a semiconductor memory such as DRAM (Dynamic Random Access Memory) and a flash memory or a magnetic recording medium such as an HDD (Hard Disk Drive).

The material selector 20 selects one of a plurality of templates and one or more synthesis areas in a template that is to be applied to layout data according to the operation information produced by the user with the operating unit 16. The material selector 20 also selects one or more moving image data to be applied to the selected template or synthesis areas according to the operation information produced by the user with the operating unit 16. That is, the material selector 20 selects materials serving as a basis for layout data. Alternatively, in lieu of the user performing such operation, preset data may be used for selecting a template or one or more synthesis areas in a template and moving image data. Selection of a template may be such that all the synthesis area in a template are selected besides a template itself being selected.

The extraction condition determiner 22 determines extraction conditions for extracting still image data from moving image data according to a relation between synthesis areas of a template selected by the material selector 20. The relationship between synthesis areas is exemplified by size ratio, distance, arrangement order, superimposition order, and aspect ratio. The extraction conditions are exemplified by the number of still image data extracted from moving image data, distance from a subject, size of a subject, subject appearance frequency, and a range of time within which images are to be extracted.

Now, the size ratio and the distance will be described here from among the relationship between synthesis areas. For example, when there are four synthesis areas having an identical size in a template, moving image data is equally time-divided into four sections because the size ratio is the same, and still images are extracted from the four sections and arranged chronologically. When there are a plurality of synthesis areas having different size ratios, an image that should attract most attention, such as one showing a subject smiling, may be positioned in the largest synthesis area, with the other images arranged in the remaining synthesis areas. The arrangement positions may be determined depending on the sizes of synthesis areas. An image to be positioned in the largest synthesis area need not be arranged by taking the chronological order into account.

Where the distances between the synthesis areas are great, the time intervals between the images to be positioned in those synthesis areas are also greater than a given time length. That is, the time intervals between the images to be extracted are determined based on the distances between the synthesis areas. In other words, images acquired with a small time interval between them must not be positioned in synthesis areas distanced from each other. Where synthesis areas overlap each other, leaving no distance between them, images acquired close to each other in time, such as continuous shots and images preceding and following a zoom may be positioned in those synthesis areas.

The moving image analyzer 26 analyzes moving image data to be applied to a template or one or more synthesis areas in a template selected by the material selector 20 from among the entered moving image data.

The still image data extractor 28 extracts frames of moving image data meeting the extraction conditions determined by the extraction condition determiner 22 based on the analysis results given by the moving image analyzer 26. For example, the still image data extractor 28 performs extraction by selecting the size of a subject represented in a frame according to the size ratio of a synthesis area or in such a manner that a person or an object represented as subject and appearing with a high frequency is positioned in synthesis areas close to each other in arrangement. Where synthesis areas overlap each other, a frame is extracted in which a major subject is not represented in a position that will be hidden by the overlap when the images are superposed.

The layout synthesizer 30 positions still image data extracted by the still image data extractor 28 in corresponding synthesis areas in the template to produce layout data. When still image data entered from the image data input unit 12 are selected so as to correspond to synthesis areas, the still image data are positioned in the respective synthesis areas in the template and combined to produce synthesized layout data.

Now, we will describe the operations of the image processing device of the invention for implementing the image processing method of the invention. An example will be given below for each of different templates.

EXAMPLE 1

Figure 2:
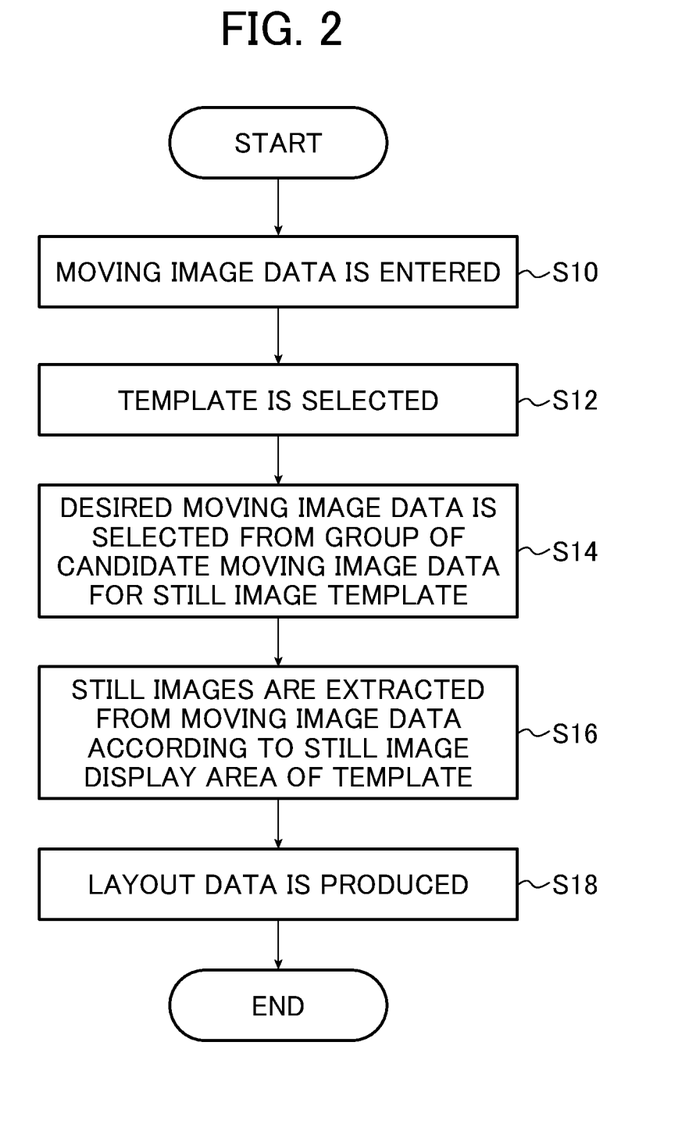
FIG. 2 is a flowchart indicating an example of the flow of the image processing method of the present invention.

FIG. 2 is a flowchart indicating an example of the flow of the image processing method of the present invention.

First, the user uses the image data input unit 12 to enter moving image data to provide materials for a photograph album (step S10). The entered moving image data (material image data) are once recorded in the image recorder 18.

Then, an operation by the user selects a template 42 (see FIG. 3) to be used by the material selector 20 (step S12).

Figure 3:
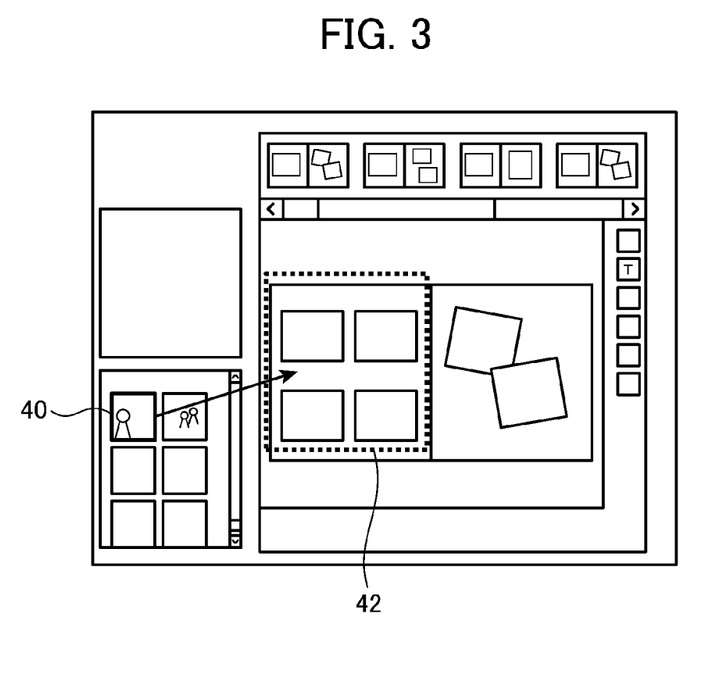
FIG. 3 is a view for explaining an example of still image extraction using a template.

In the example 1, the template 42 is used for extracting a plurality of (e.g., four) still images having an identical size from moving image data 40 as illustrated in FIG. 3.

In the editing screen of an image processing application as illustrated in FIG. 3, a group of candidate moving image are called up on the screen from the image recorder 18 and displayed on the left side of the screen while the template 42 is displayed at the center. An operation by the user causes desired moving image data 40, which was entered in the step S10 and recorded, to be dragged from a group of candidate moving image data, dropped onto the template 42, and selected by the material selector 20 (step S14).

Because the synthesis areas (still image display areas) in the template 42 are four still image synthesis areas having an identical size, the extraction condition determiner 22 evenly divides the moving image data 40 into four sections according to the relationship between the synthesis areas, determines the parameters for detection of a major subject, sound analysis, etc., and determines extraction conditions for extracting optimal parts. Then, the moving image data 40 is analyzed by the moving image data analyzer 26. Based on the analysis results of the moving image data 40, the still image data extractor 28 extracts frames meeting the extraction conditions from the sections of the moving image data as still image data (step S16).

The frames meeting the extraction conditions may extend over a given range of time, that is, may be a plurality of frames. To further proceed to extract one frame as still image data, one may, for example, extract a subject (object) from a plurality of frames meeting the extraction conditions, calculates the acceleration of the subject from the change in position in the frames arranged in chronological order, and extract a frame containing the subject having an acceleration greater than a predetermined reference acceleration (when there are still two or more frames, a frame where the acceleration is the greatest) as still image data.

Alternatively, frames where a front face, a smile, a full length, etc. of a major subject previously registered is detected may be extracted, or image analysis may be effected to calculate the velocity and acceleration of a subject and extract frames according to the characteristics of the camera movement, or a frame with which a zoom is completed may be extracted. Alternatively still, sound analysis may be effected to extract frames where the voice of a subject or the photographer is detected.

The extracted still image data and the template 42 are combined by the layout synthesizer 30 to produce layout data, which is recorded in the image recorder 18. Thus, photograph album data is produced and recorded (step S18).

Still other extraction conditions may be used to extract still image data: the moving image data may be divided by change in a major subject, camera movement, and other like events obtained from the analysis results of the moving image data 40 to extract the chronologically central part of each event as still image data.

EXAMPLE 2

An example 2 is similar to the example 1 except for the selected template, and therefore a description below will be made of the steps as from the selection of a template onward referring to the flowchart of FIG. 2.

An operation by the user selects a template 44 (see FIG. 4) to be used by the material selector 20 (step S12).

Figure 4:
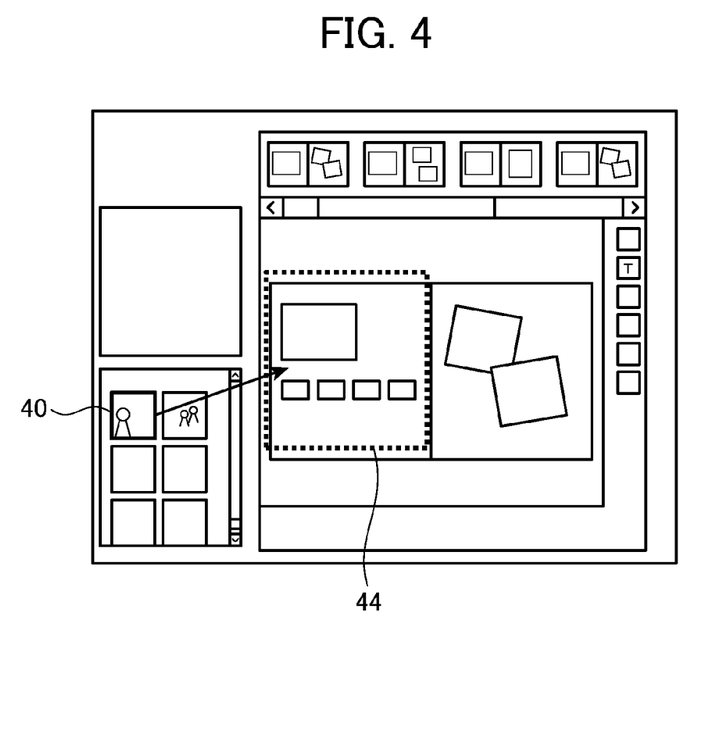
FIG. 4 is a view for explaining another example of still image extraction using a template.

In the example 2, the template 44 is used by way of example for extracting a large still image and a plurality (four) of small still images from the moving image data 40 as illustrated in FIG. 4.

In the editing screen of an image processing application as illustrated in FIG. 4, a group of candidate moving image are called up on the screen from the image recorder 18 and displayed on the left side of the screen while the template 44 is displayed at the center. An operation by the user causes desired moving image data 40, which was entered in the step S10 and recorded, to be dragged from a group of candidate moving image data, dropped onto the template 42, and selected by the material selector 20 (step S14).

Because the relationship between the synthesis areas in the template 44 is such that the synthesis areas comprise one large still image and a plurality (four) of small still images, the extraction condition determiner 22 first equally time-divides the moving image data 40 into two sections, with the first half corresponding to the synthesis area for the large still image, while further dividing the second half into four sections so as to correspond to the synthesis areas for the small still images.

For example, in the case of a 30-second moving image data, the first 15-second section thereof can be allocated to the large still image while the 16-second to 30-second section is further divided into four sections so that they can be allocated to the synthesis areas for the small still images. Then, for each of the synthesis areas, parameters such as detection of a major subject, sound analysis, etc. as in the example 1 are determined, and extraction conditions for extracting optimal parts are determined.

Then, the moving image data 40 is analyzed by the moving image data analyzer 26. Based on the analysis results of the moving image data 40, the still image data extractor 28 extracts frames meeting the extraction conditions from the sections of the moving image data as still image data (step S16).

The extracted still image data and the template 44 are combined by the layout synthesizer 30 to produce layout data, which is recorded in the image recorder 18. Thus, photograph album data is produced and recorded (step S18).

EXAMPLE 3

An example 3 is similar to the example 1 except for the selected template and synthesis areas, and therefore a description will be made from the selection of a template referring to the flowchart of FIG. 2.

An operation by the user selects synthesis areas 46 (part of a template, see FIG. 5) to be used by the material selector 20 (step S12).

Figure 5:
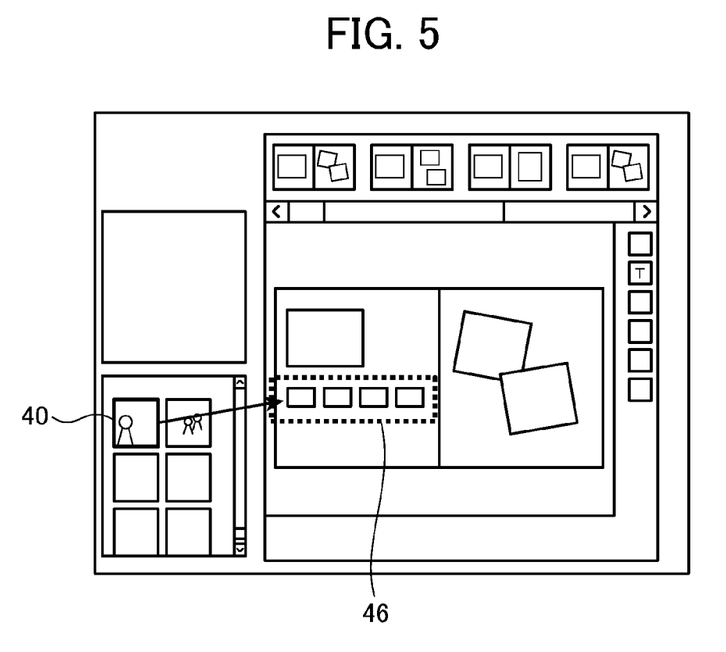
FIG. 5 is a view for explaining an example of still image extraction using a template, where a part of synthesis areas is designated.

In the example 3, the synthesis areas 46 are used by way of example for extracting a plurality (four) of still images from the moving image data 40 as illustrated in FIG. 5.

In the editing screen of an image processing application as illustrated in FIG. 5, a group of candidate moving image are called up on the screen from the image recorder 18 and displayed on the left side of the screen while the template is displayed at the center. An operation by the user causes desired moving image data 40, which was entered in the step S10 and recorded, to be dragged from a group of candidate moving image data, dropped onto one of the four synthesis areas 46, and selected by the material selector 20 (step S14).

Because the synthesis areas 46 in the template are composed of a plurality (four) of synthesis areas for small still images, the extraction condition determiner 22 divides the moving image data 40 into four sections according to the relationship between the synthesis areas so that these sections correspond to the respective synthesis areas for the still images. For each of the synthesis areas, parameters such as detection of a major subject, sound analysis, etc. are determined as in the example 1, and extraction conditions for extracting optimal parts are determined.

Then, the moving image data 40 is analyzed by the moving image data analyzer 26. Based on the analysis results of the moving image data 40, the still image data extractor 28 extracts frames meeting the extraction conditions from the sections of the moving image data as still image data (step S16).

The extracted still image data and the template including the synthesis areas 46 are combined by the layout synthesizer 30 to produce layout data, which is recorded in the image recorder 18. Thus, photograph album data is produced and recorded (step S18).

Because the synthesis areas 46 are close to each other, a group of related still image data may be extracted from moving image data. For example, when 10-second moving image data contains a child or other moving subject that remains stationary first and starts running at a 6-second point and keeps moving through a 10-second point, still image data may be extracted at a given time interval (e.g., 1 second) from that 6 to 10-second section of the moving image data where the subject is moving, and arranged like continuous shots. Still image data may be extracted based on a tone of color or composition in lieu of the movement of a subject.

EXAMPLE 4

An example 4 is similar to the example 1 except for the selected template, and therefore a description below will be made of the steps as from the selection of a template onward referring to the flowchart of FIG. 2.

An operation by the user selects a template 48 (see FIG. 6) to be used by the material selector 20 (step S12).

Figure 6:
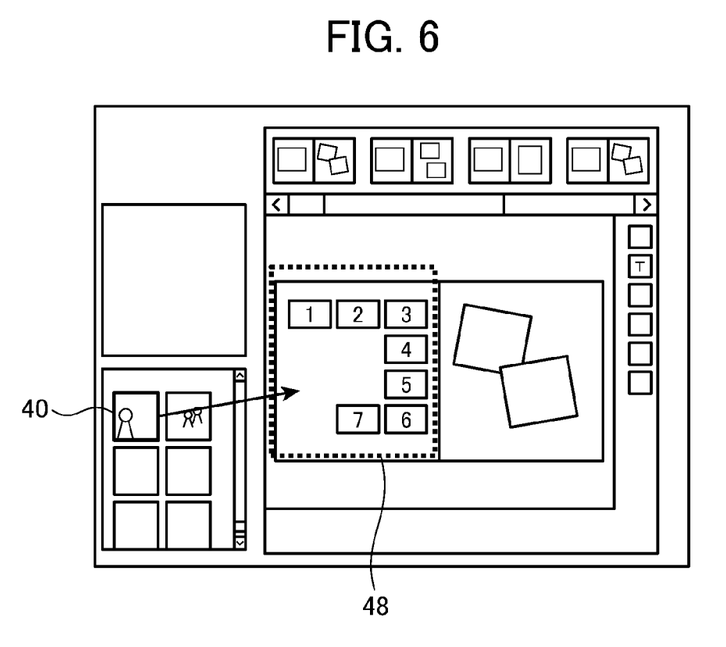
FIG. 6 is a view for explaining an example of extraction using a template to achieve chronological arrangement of still images.

In the example 4, a template 48 is used by way of example for extracting a plurality (seven) of chronologically ordered still images from the moving image data 40 as illustrated in FIG. 6.

In the editing screen of an image processing application as illustrated in FIG. 6, a group of candidate moving image are called up on the screen from the image recorder 18 and displayed on the left side of the screen while the template 48 is displayed at the center. An operation by the user causes desired moving image data 40, which was entered in the step S10 and recorded, to be dragged from a group of candidate moving image data, dropped onto the template 48, and selected by the material selector 20 (step S14).

Because the template 48 is a synthesis area composed of a plurality (seven) of still images (image 1 to 7 in chronological order in FIG. 6), the extraction condition determiner 22 divides the moving image data 40 into seven sections according to the relationship between the synthesis areas to allocate these sections to the respective synthesis areas for the chronologically ordered still images. For each of the synthesis areas, parameters such as detection of a major subject, sound analysis, etc. are determined as in the example 1, and extraction conditions for extracting optimal parts are determined. The chronological order of the image data in the template 48 may be designated by the user or may have been previously registered in the template 48.

Then, the moving image data 40 is analyzed by the moving image data analyzer 26. Based on the analysis results of the moving image data 40, the still image data extractor 28 extracts frames meeting the extraction conditions from the sections of the moving image data as still image data (step S16).

The extracted still image data and the template 48 are laid out in an arrangement corresponding to the chronological order that is set in the template 48 and combined by the layout synthesizer 30 to produce layout data, which is recorded in the image recorder 18. Thus, photograph album data is produced and recorded (step S18).

EXAMPLE 5

An example 5 is similar to the example 1 except for the selected template, and therefore a description below will be made as from the selection of a template onward referring to the flowchart of FIG. 2.

An operation by the user selects a template 50 (see FIG. 7) to be used by the material selector 20 (step S12).

Figure 7:
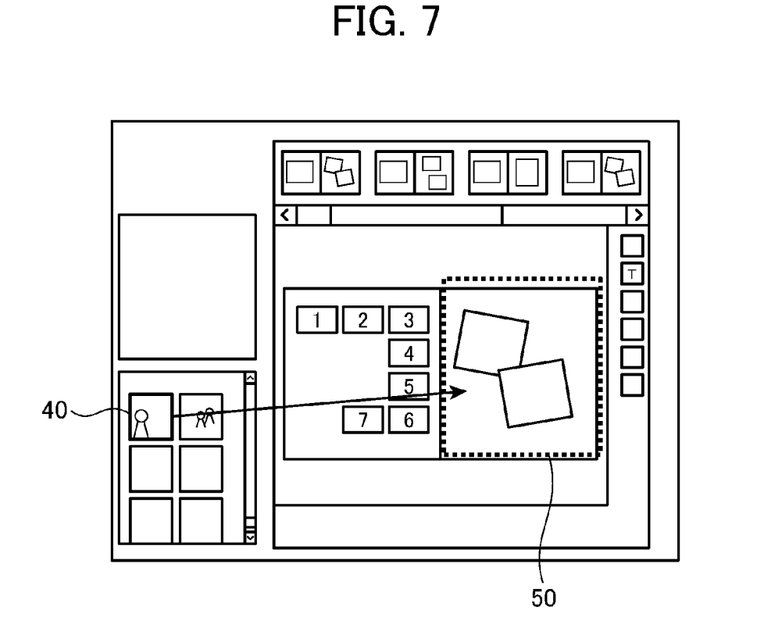
FIG. 7 is a view for explaining an example of still image extraction using a template, where still images preceding and following a zoom are extracted.

In the template 50 in the example 5, two still image synthesis areas overlap each other as illustrated in FIG. 7. In this case, still image extraction is effected using the template 50 whereby a still image preceding a zoom and a still image following the zoom are extracted from the moving image data 40 and arranged so that the latter is placed over the former.

In the editing screen of an image processing application as illustrated in FIG. 7, a group of candidate moving images are called up on the screen from the image recorder 18 and displayed on the left side of the screen while the template 50 is displayed at the center. An operation by the user causes desired moving image data 40, which was entered in the step S10 and recorded, to be dragged from a group of candidate moving image data, dropped onto the template 50, and selected by the material selector 20 (step S14).

Because the template 50 is of a type having two overlapping still image synthesis areas, the extraction condition determiner 22 allocates a still image preceding a zoom in the moving image data 40 to the lower synthesis area and a still image following the zoom to the upper synthesis area according to the relationship between the synthesis areas. Meanwhile, zoom detection parameters are determined, and extraction conditions for extracting optimal parts are determined.

Then, the moving image data 40 is analyzed by the moving image data analyzer 26. Based on the analysis results of the moving image data 40, the still image data extractor 28 extracts frames meeting the extraction conditions from the sections of the moving image data as still image data (step S16).

The extracted still image data and the template 50 are combined by the layout synthesizer 30 to produce layout data, which is recorded in the image recorder 18. Thus, photograph album data is produced and recorded (step S18).

The distance from the subject may be used for extraction of still images in lieu of using the chronological order of still images, i.e., those preceding and following a zoom. For example, a still image representing a distant subject may be placed underneath and a still image representing a subject nearby may be placed over it. Although the template 50 illustrated in FIG. 7 is for two images, it may be a template for three or more images overlapping each other.

EXAMPLE 6

An example 6 is similar to the example 1 except for the selected template, and therefore a description below will be made of the steps as from the selection of a template onward referring to the flowchart of FIG. 2.

An operation by the user selects synthesis areas 52, 54 of a template (see FIG. 8) to be used by the material selector 20 (step S12).

Figure 8:
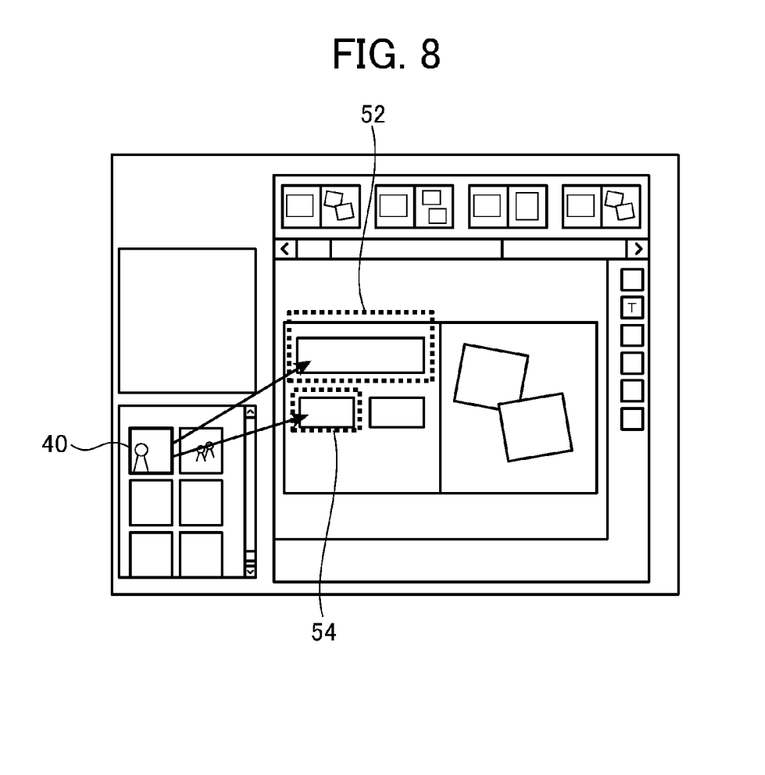
FIG. 8 is a view for explaining an example of still image extraction using a template, where still images having different aspect ratios are extracted.

The template in the example 6 is composed of a synthesis area 52 having panoramic dimensions with an aspect ratio different from that of normal dimensions and synthesis areas 54 having normal dimensions as illustrated in FIG. 8. An image having panoramic dimensions and images having normal dimensions are extracted from the moving image data 40 using the synthesis areas 52, 54 of the template.

In the editing screen of an image processing application as illustrated in FIG. 8, a group of candidate moving images are called up on the screen from the image recorder 18 and displayed on the left side of the screen while the template is displayed at the center. An operation by the user causes desired moving image data 40, which was entered in the step S10 and recorded, to be dragged from a group of candidate moving image data, dropped into the synthesis areas 52, 54 of the template, and selected by the material selector 20 (step S14).

The extraction condition determiner 22 determines that the synthesis area 52 is a synthesis area for a panoramic image because the aspect ratio differs between the synthesis area 52 and the synthesis areas 54 and the aspect ratio of the synthesis area 52 is wider than tall as compared with the aspect ratio of the synthesis areas 54. Because the synthesis area 52 is for a panoramic image, an image from a section of the moving image data 50 containing a horizontal movement (pan) is allocated to the synthesis area 52. Meanwhile, pan detection parameters are determined, and extraction conditions for extracting optimal parts are determined. Because the synthesis areas 54 are for normal images, time division, for example, is used to determine extraction conditions as in the example 1.

Then, the moving image data 40 is analyzed by the moving image data analyzer 26. Based on the analysis results of the moving image data 40, the still image data extractor 28 extracts frames meeting the extraction conditions from the sections of the moving image data as still image data (step S16).

To obtain a panoramic image to be allocated to the synthesis area 52, the moving image analyzer 26 analyzes the moving image data 40 to select a plurality of frames that can be combined into a panoramic image from a section of the moving image data containing a horizontal movement, and the selected frames are combined to produce a synthesized panoramic image (still image). Besides using image analysis, when the moving image data 40 contains data produced by a sensor such as a motion sensor (acceleration sensor) that detects a camera movement, such data may be used to produce a panoramic image.

The extracted still image data and the template containing the synthesis areas 52, 54 are combined by the layout synthesizer 30 to produce layout data, which is recorded in the image recorder 18. Thus, photograph album data is produced and recorded (step S18).

EXAMPLE 7

An example 7 is similar to the example 1 except for the selected template and except that layout data for shuffle print is produced in lieu of a photograph album. Therefore a description will be made below from the steps of the selection of a template onward referring to the flowchart of FIG. 2.

Figure 9:
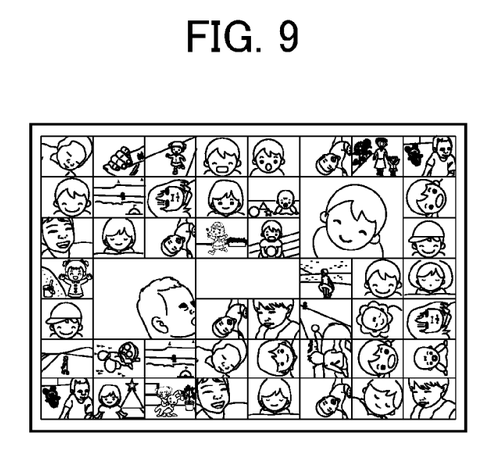
FIG. 9 is a view for explaining an example of shuffle print.

In the example 7, a number of small images make up a large still image for producing a so-called shuffle print as illustrated in FIG. 9.

An operation by the user selects a template 56 (see FIG. 10) to be used by the material selector 20 (step S12).

Figure 10:
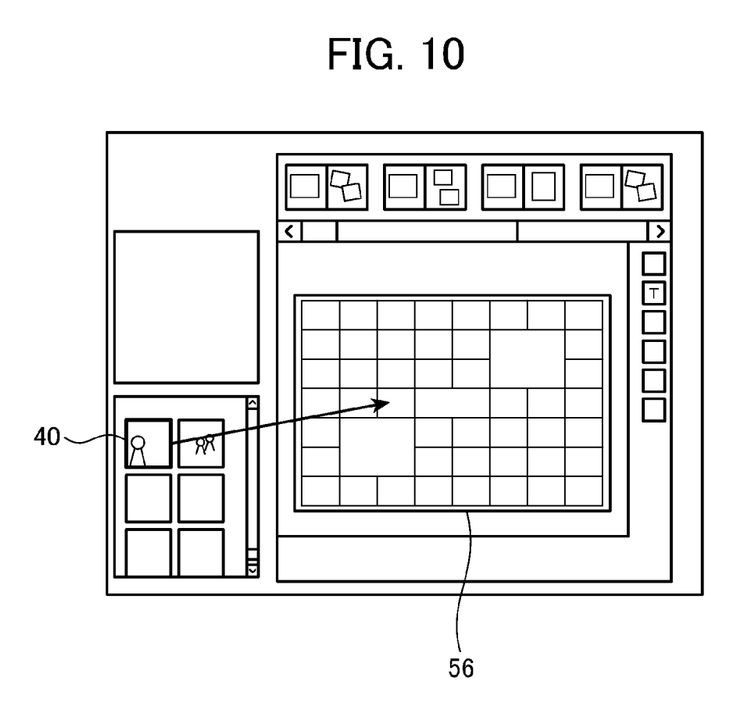
FIG. 10 is a view for explaining an example of a template for shuffle print.

The template used in the example 7 is the template 56 for shuffle print as illustrated in FIG. 10 produced by arranging various still images randomly extracted from the moving image data 40.

In the editing screen of an image processing application as illustrated in FIG. 10, a group of candidate moving image are called up on the screen from the image recorder 18 and displayed on the left side of the screen while the template for shuffle print is displayed at the center. An operation by the user causes desired moving image data 40, which was entered in the step S10 and recorded, to be dragged from a group of candidate moving image data, dropped onto the template 56, and selected by the material selector 20 (step S14).

The extraction condition determiner 22 determines that a shuffle print is to be produced from the relationship between the synthesis areas and selects, for example, a major subject to determine candidate images for extraction containing that major subject from the moving image data 40. Meanwhile, parameters for detecting the major subject are determined, and extraction conditions for extracting optimal parts are determined.

Then, the moving image data 40 is analyzed by the moving image data analyzer 26. Based on the analysis results of the moving image data 40, the still image data extractor 28 extracts frames meeting the extraction conditions from the sections of the moving image data as still image data (step S16).

While the still images containing the major subject are allocated to synthesis areas randomly, smiles, front faces, and the like may be allocated to relatively large synthesis areas.

The extracted still image data and the template 56 are combined by the layout synthesizer 30 to produce layout data, which is recorded in the image recorder 18. Thus, print data is produced and recorded (step S18).

The layout data produced in the above examples are printed by a printer, not shown, to obtain prints, which are bound by a book binding device, not shown, to produce a photograph album.

Figure 11:
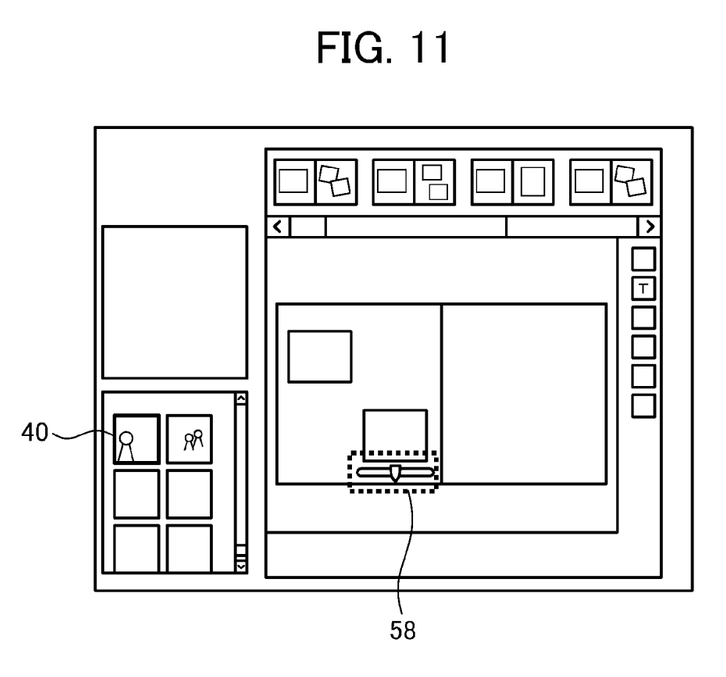
FIG. 11 is a view for explaining an example of still image selection in synthesis areas of a template.

In the above examples, there may be a case where the user is not satisfied with some still images automatically arranged in the synthesis areas of the template. In such a case, still image data extracted from the moving image data 40 may be replaceable with any others preferred using a slide bar 58 as illustrated in FIG. 11 when the still image data are based on moving image data.

Figure 12:
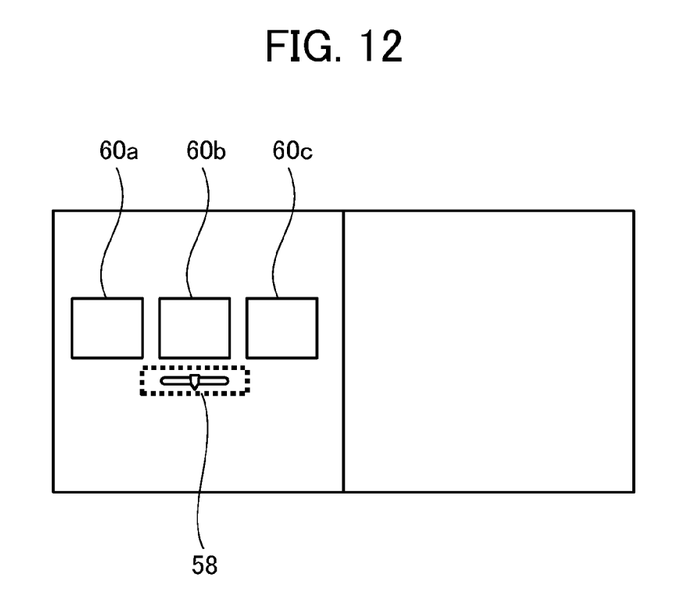
FIG. 12 is a view for explaining another example of still image selection in synthesis areas of a template.

Further, when, for example, three still images 60*a* to 60*c* are extracted from a 30-second moving image according to the recording time and arranged evenly spaced as illustrated in FIG. 12, the ranges of section of the moving image from which other still images are extracted to replace the still images 60*a*, 60*b*, and 60*c* may be set as 0 to 10 seconds, 11 to 20 seconds, and 21 to 30 seconds, respectively.

Figure 13A:
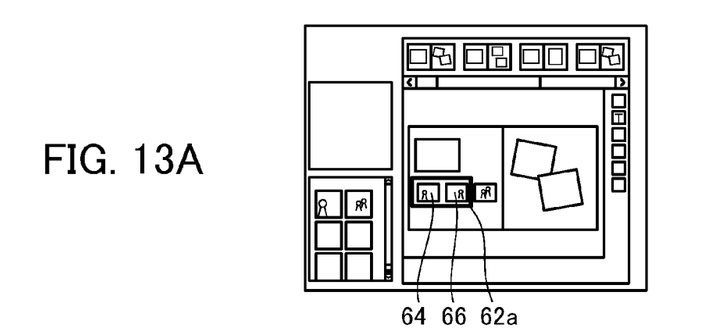
FIGS. 13A to 13D are views for explaining an example where a still image is added between still images automatically arranged.
Figure 13B:
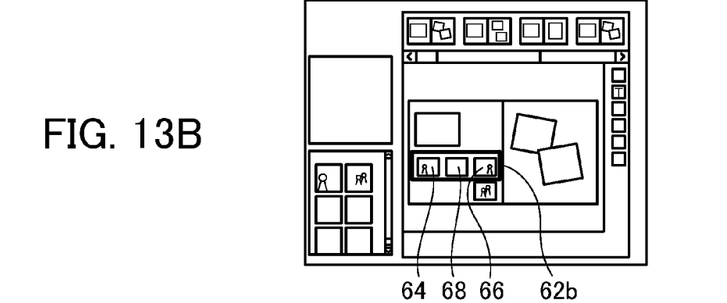

Further, there may be a case where the user desires to add still images between those automatically arranged. For example, when the user desires to accentuate an event between two automatically and chronologically arranged synthesis areas 64, 66, a selection frame 62*a* is placed to surround the synthesis areas 64, 66 as illustrated in FIG. 13A, Then, the user uses the operating unit 16 to add a synthesis area 68 as illustrated in FIG. 13B. At this time, the selector frame 62*a* becomes a selector frame 62*b* containing the synthesis areas 64, 66, and 68.

Figure 13C:
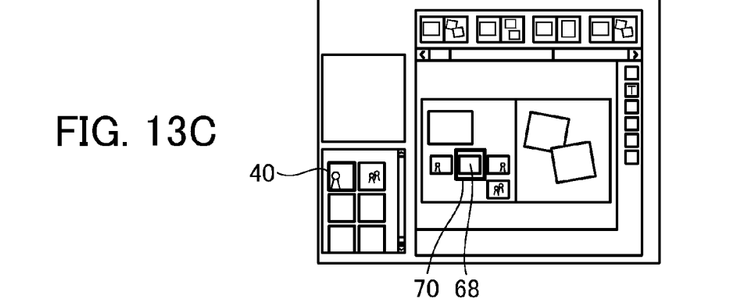
Figure 13D:
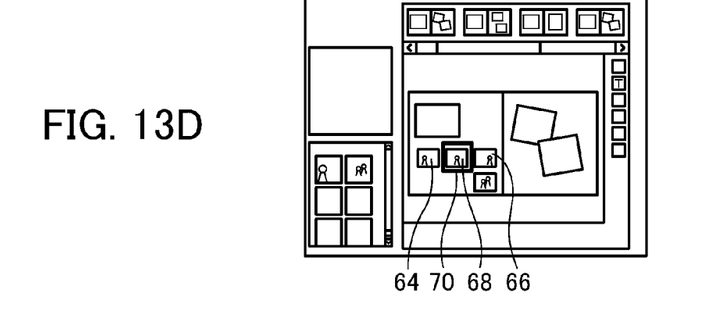

Then, the user performs an operation to select the synthesis area 68, whereupon a selector frame 70 is displayed as illustrated in FIG. 13C. Now, a still image data is extracted again from the moving image data 40, whereupon, as illustrated in FIG. 13D, a still image is extracted from a frame existing between the still images chronologically arranged in the synthesis areas 64, 66 and allocated to the synthesis area 68. Thus, another still image is added to the synthesis area 68 between the two still images chronologically placed in the originally provided synthesis areas 64, 66 so as to accentuate the event between the two synthesis areas.

The extraction conditions for extracting still image data from the moving image data may be set by correcting the template as described above.

As described above, according to the image processing device and the image processing method of the present invention, the extraction conditions for extracting still images from a moving image are determined according to a template, which saves the user the time and effort for selecting still images from numerous candidate still images and whereby a print or a photograph album can be readily produced based on the template. Further, even a photograph album containing panoramic images or other still images having a different aspect ratio than normal images can be readily produced, and prints or a photograph album suiting the user's preferences can be readily produced.

In the prior art, judgment as to how many still images are to be extracted at time intervals of how many seconds was difficult to make by simply dividing moving image data to extract still image data. However, according to the invention, merely designating a template as in the example 1 allows a required number of still images to be extracted according to a selected template.

Further, extraction procedure for extracting appropriate still images for different templates that required much time and effort in the prior art can be readily achieved by providing various synthesis areas for the template and setting attributes as in the examples 2 to 7.

While the above examples have been described in a case of extraction made from single moving image data, the moving image data display section in the editing screen of the image processing application can display a plurality of moving image data, so that still images may of course be extracted from different moving image data and allocated to the respective synthesis areas in the template.

The layout in the template may be a previously set layout or the layout may be adjusted as desired by the user by changing the positions, sizes, etc. of the synthesis areas.

While an image processing application for producing a photograph album has been described in the above examples 1 to 6, the invention may be applied to a template print consisting of a single sheet of mat.

Further, when a template has numerous synthesis areas, say 10 or more, and the moving image data from which material still images are to be extracted is relatively short, still images only so many as can be extracted may be extracted if a sufficient number of still images cannot be extracted.

The steps taken in the above image processing method may be configured to be an image processing program for causing a computer to execute the steps of the image display method described above, or may be configured to be an image processing program enabling computers to function as means for executing the respective steps of the image processing method or to function as means for forming components of the image processing device described above.

Further, the above image processing program may be configured in the form of a computer readable medium or a computer readable memory.

While the image processing device, image processing method, and a program according to the invention has been described in detail above, the present invention is not limited to the above embodiments, and various modifications may be made without departing from the spirit and scope of the invention.

What is claimed is:

1. An image processing device for obtaining layout data by extracting still image data from moving image data, comprising:
   an image data input device configured to receive image data containing at least the moving image data, and
   a processor comprising:
   a material selector configured to select a template and the moving image data applied to the layout data,
   an extraction condition determiner configured to determine extraction conditions for extracting the still image data from the moving image data according to a relationship between synthesis areas of the selected template,
   a moving image analyzer configured to analyze the moving image data,
   a still image data extractor configured to extract the still image data meeting the extraction conditions from the moving image data according to an analysis results, and
   a layout synthesizer configured to produce the layout data by positioning the extracted still image data in corresponding synthesis areas of the template,
   wherein the relationship between the synthesis areas is a distance.

2. The image processing device according to claim 1, wherein the extraction conditions are one or more of a number of the still image data extracted from the moving image data, distance from a subject, and a time range within which extraction is made.

3. The image processing device according to claim 2, wherein one of the extraction conditions is the distance from the subject, and wherein the extraction condition determiner is configured to extract zoom or a change in the distance from the subject.

4. The image processing device according to claim 1, wherein when synthesis areas adjacent to each other in the template are selected by the material selector, the synthesizer is configured to arrange the extracted still images as continuously shot photographs of a moving subject arranged at a given time interval.

5. A print production system comprising an image processing device for obtaining layout data by extracting still image data from moving image data, and a printer for printing the layout data obtained by the image processing device, the image processing device comprising:
an image data input device configured to receive image data containing at least the moving image data, and
a processor comprising:
a material selector configured to select a template and the moving image data applied to the layout data,
an extraction condition determiner configured to determine extraction conditions for extracting the still image data from the moving image data according to a relationship between synthesis areas of the selected template,
a moving image analyzer configured to analyze the moving image data,
a still image data extractor configured to extract the still image data meeting the extraction conditions from the moving image data according to an analysis results, and
a layout synthesizer configured to produce the layout data by positioning the extracted still image data in corresponding synthesis areas of the template,
wherein the relationship between the synthesis areas is a distance.

6. A photograph album production system comprising an image processing device for obtaining layout data by extracting still image data from moving image data, a printer for printing the layout data obtained by the image processing device and a book binding device for binding paper sheets printed by the printer, the image processing device comprising:
an image data input device configured to receive image data containing at least the moving image data, and
a processor comprising:
a material selector configured to select a template and the moving image data applied to the layout data,
an extraction condition determiner configured to determine extraction conditions for extracting the still image data from the moving image data according to a relationship between synthesis areas of the selected template,
a moving image analyzer configured to analyze the moving image data,
a still image data extractor configured to extract the still image data meeting the extraction conditions from the moving image data according to an analysis results, and
a layout synthesizer configured to produce the layout data by positioning the extracted still image data in corresponding synthesis areas of the template,
wherein the relationship between the synthesis areas is a distance.

7. An image processing method for obtaining layout data by extracting still image data from moving image data, comprising the steps of:
receiving image data containing at least the moving image data,
selecting a template and the moving image data applied to the layout data,
determining extraction conditions for extracting the still image data from the moving image data according to a relationship between synthesis areas of the selected template,
analyzing the moving image data,
extracting the still image data meeting the extraction conditions from the moving image data according to an analysis results, and
producing the layout data by positioning extracted still image data in corresponding synthesis areas of the template,
wherein the relationship between the synthesis areas is a distance.

8. A non-transitory computer readable recording medium having a computer program recorded thereon, for causing a computer to execute the steps of an image processing method for obtaining layout data by extracting still image data from moving image data, the image processing method comprising the steps of:
receiving image data containing at least the moving image data,
selecting a template and the moving image data applied to the layout data,
determining extraction conditions for extracting the still image data from the moving image data according to a relationship between synthesis areas of the selected template,
analyzing the moving image data,
extracting the still image data meeting the extraction conditions from the moving image data according to an analysis results, and
producing the layout data by positioning extracted still image data in corresponding synthesis areas of the template,
wherein the relationship between the synthesis areas is a distance.

9. An image processing device for obtaining layout data by extracting still image data from moving image data, comprising:
an image data input device configured to receive image data containing at least the moving image data, and
a processor comprising:
a material selector configured to select a template and the moving image data applied to the layout data,
an extraction condition determiner configured to determine extraction conditions for extracting the still image data from the moving image data according to a relationship between synthesis areas of the selected template,
a moving image analyzer configured to analyze the moving image data,
a still image data extractor configured to extract the still image data meeting the extraction conditions from the moving image data according to an analysis results, and
a layout synthesizer configured to produce the layout data by positioning the extracted still image data in corresponding synthesis areas of the template, wherein,
the relationship between the synthesis areas is the aspect ratio, and
when a first synthesis area is a synthesis area for a panoramic image in which the aspect ratio of the first synthesis area is wider than tall as compared with other synthesis areas, the still image data extractor is configured to extract still image data of the panoramic image from the moving image data, and the layout synthesizer is configured to position the extracted still image data in the first synthesis area.

10. A print production system comprising an image processing device for obtaining layout data by extracting still image data from moving image data, and a printer for printing the layout data obtained by the image processing device, the image processing device comprising:
an image data input device configured to receive image data containing at least the moving image data, and
a processor comprising:
a material selector configured to select a template and the moving image data applied to the layout data,
an extraction condition determiner configured to determine extraction conditions for extracting the still image data from the moving image data according to a relationship between synthesis areas of the selected template,
a moving image analyzer configured to analyze the moving image data,
a still image data extractor configured to extract the still image data meeting the extraction conditions from the moving image data according to an analysis results, and
a layout synthesizer configured to produce the layout data by positioning the extracted still image data in corresponding synthesis areas of the template, wherein,
the relationship between the synthesis areas is the aspect ratio, and
when a first synthesis area is a synthesis area for a panoramic image in which the aspect ratio of the first synthesis area is wider than tall as compared with other synthesis areas, the still image data extractor is configured to extract still image data of the panoramic image from the moving image data, and the layout synthesizer is configured to position the extracted still image data in the first synthesis area.

11. A photograph album production system comprising an image processing device for obtaining layout data by extracting still image data from moving image data, a printer for printing the layout data obtained by the image processing device and a book binding device for binding paper sheets printed by the printer, the image processing device comprising:
an image data input device configured to receive image data containing at least the moving image data, and
a processor comprising:
a material selector configured to select a template and the moving image data applied to the layout data,
an extraction condition determiner configured to determine extraction conditions for extracting the still image data from the moving image data according to a relationship between synthesis areas of the selected template,
a moving image analyzer configured to analyze the moving image data,
a still image data extractor configured to extract the still image data meeting the extraction conditions from the moving image data according to an analysis results, and
a layout synthesizer configured to produce the layout data by positioning the extracted still image data in corresponding synthesis areas of the template, wherein,
the relationship between the synthesis areas is the aspect ratio, and
when a first synthesis area is a synthesis area for a panoramic image in which the aspect ratio of the first synthesis area is wider than tall as compared with other synthesis areas, the still image data extractor is configured to extract still image data of the panoramic image from the moving image data, and the layout synthesizer is configured to position the extracted still image data in the first synthesis area.

12. An image processing method for obtaining layout data by extracting still image data from moving image data, comprising the steps of:
receiving image data containing at least the moving image data,
selecting a template and the moving image data applied to the layout data,
determining extraction conditions for extracting the still image data from the moving image data according to a relationship between synthesis areas of the selected template,
analyzing the moving image data,
extracting the still image data meeting the extraction conditions from the moving image data according to an analysis results, and
producing the layout data by positioning extracted still image data in corresponding synthesis areas of the template, wherein,
the relationship between the synthesis areas is the aspect ratio, and
when a first synthesis area is a synthesis area for a panoramic image in which the aspect ratio of the first synthesis area is wider than tall as compared with other synthesis areas, the still image data of the panoramic image is extracted from the moving image data, and the extracted still image data is positioned in the first synthesis area.

13. A non-transitory computer readable recording medium having a computer program recorded thereon, for causing a computer to execute the steps of an image processing method for obtaining layout data by extracting still image data from moving image data, the image processing method comprising the steps of:
receiving image data containing at least the moving image data,
selecting a template and the moving image data applied to the layout data,
determining extraction conditions for extracting the still image data from the moving image data according to a relationship between synthesis areas of the selected template,
analyzing the moving image data,
extracting the still image data meeting the extraction conditions from the moving image data according to an analysis results, and
producing the layout data by positioning extracted still image data in corresponding synthesis areas of the template, wherein,
the relationship between the synthesis areas is the aspect ratio, and
when a first synthesis area is a synthesis area for a panoramic image in which the aspect ratio of the first synthesis area is wider than tall as compared with other synthesis areas, the still image data of the panoramic image is extracted from the moving image data, and the extracted still image data is positioned in the first synthesis area.

* * * * *